US012770208B2

(12) United States Patent
Goh et al.

(10) Patent No.: US 12,770,208 B2
(45) Date of Patent: Oct. 20, 2026

(54) DEVICE, METHOD AND SYSTEM FOR REDUCING NETWORK BANDWIDTH USAGE WHEN PROVIDING ALERTS

(71) Applicant: MOTOROLA SOLUTIONS, INC., Chicago, IL (US)

(72) Inventors: Zhe Qian Goh, Simpang Ampat (MY); Syed Isa Syed Idrus, Bayan Lepas (MY); Chee Wen Tan, Georgetown (MY); Muhammad Saeed Yasin, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 170 days.

(21) Appl. No.: 18/520,970

(22) Filed: Nov. 28, 2023

(65) Prior Publication Data

US 2025/0173807 A1 May 29, 2025

(51) Int. Cl.
*G06Q 50/26* (2012.01)
*H04L 47/12* (2022.01)

(52) U.S. Cl.
CPC ........... *G06Q 50/265* (2013.01); *H04L 47/12* (2013.01)

(58) Field of Classification Search
CPC .............................. G06Q 50/265; H04L 47/12
(Continued)

(56) References Cited

U.S. PATENT DOCUMENTS 9,368,021 B2 6/2016 Touloumtzis
10,750,345 B1 * 8/2020 Tengwall ................ H04W 4/08
(Continued)

FOREIGN PATENT DOCUMENTS

WO WO-2009038765 A1 * 3/2009 ........... G08B 27/008
WO WO-2011049725 A1 * 4/2011 ............. H04L 47/12

OTHER PUBLICATIONS

Bratcher, Jeff, "Experience FirstNet: How priority and preemption help public safety connect when they need it most", Jul. 16, 2020; firstnet.gov, 9 pages (Year: 2020).*

(Continued)

*Primary Examiner* — Shannon S Campbell
*Assistant Examiner* — Freda A Nelson
(74) *Attorney, Agent, or Firm* — PERRY + CURRIER INC. (FOR MSI)

(57) ABSTRACT

A device receives an indication of an incident associated with a given premises, the device having access to: network addresses associated with individuals associated with the given premises, and electronic roles and schedules of the individuals. The device classifies the individuals as recipients or nonrecipients of alerts for the incident based on the roles/schedules, and determines respective current activity classifications of the recipients and nonrecipients based on the roles/schedules. The device identifies, from the current activity classifications, respective relationship statuses between the recipients and nonrecipients, and generates at least one alert based on the respective relationship statuses, the at least one alert including instructions for a recipient to carry out relative to respective nonrecipients. The device transmits, over a network, the at least one alert to respective network addresses associated with the recipients, and refrains transmitting the at least one alert to the respective network addresses associated with the nonrecipients.

18 Claims, 7 Drawing Sheets

(58) Field of Classification Search
USPC .......................................................... 705/325
See application file for complete search history.

(56) References Cited

U.S. PATENT DOCUMENTS

| | | | | |
|---|---|---|---|---|
| 2010/0246444 | A1* | 9/2010 | Witzel | ................ H04L 65/1095 370/255 |
| 2015/0282108 | A1* | 10/2015 | Kiss | ...................... H04W 8/005 455/435.1 |
| 2017/0287317 | A1 | 10/2017 | Tavares | |
| 2018/0027397 | A1* | 1/2018 | Klein | .................... H04W 4/029 455/404.2 |
| 2018/0204428 | A1 | 7/2018 | Asaro et al. | |
| 2020/0043119 | A1 | 2/2020 | Braun et al. | |
| 2021/0183218 | A1 | 6/2021 | Johnson et al. | |
| 2021/0314757 | A1 | 10/2021 | Pellegrini et al. | |
| 2023/0089682 | A1 | 3/2023 | Papadimitriou et al. | |
| 2023/0169807 | A1* | 6/2023 | Schuler | .................... G06N 7/01 340/5.2 |

OTHER PUBLICATIONS

Batallones, Sherian, "Centralize Incident Response Management with the Teams Emergency Operations Center (TEOC)" m Sep. 7, 2023, avepoint.com; 3 pages. (Year: 2023).*
Czachor, Emily Mae, "An emergency alert test sounded today on all U.S. cellphones, TVs and radios. Here's what happened", Oct. 4, 2023, cbsnews.com, 10 pages (Year: 2023).*
Ooi, Chun Wen, et al., "Method for Digital Assistant to Perform Repetition Based on Context Analytic", Motorola Solutions Inc., Apr. 5, 2023.

* cited by examiner

DEVICE, METHOD AND SYSTEM FOR REDUCING NETWORK BANDWIDTH USAGE WHEN PROVIDING ALERTS

BACKGROUND OF THE INVENTION

When incidents occur at a premises, a messaging system may transmit a mass alert to network addresses that are registered with the message system and that are associated with the premises. However, such a mass alert may use excess bandwidth at the premises. When first responders, dispatched to the premises to respond to the incident, attempt to use their communication devices to communicate, the excess use of bandwidth by the mass alert, and any resulting communications, may interfere with communications of the first responder communication devices.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
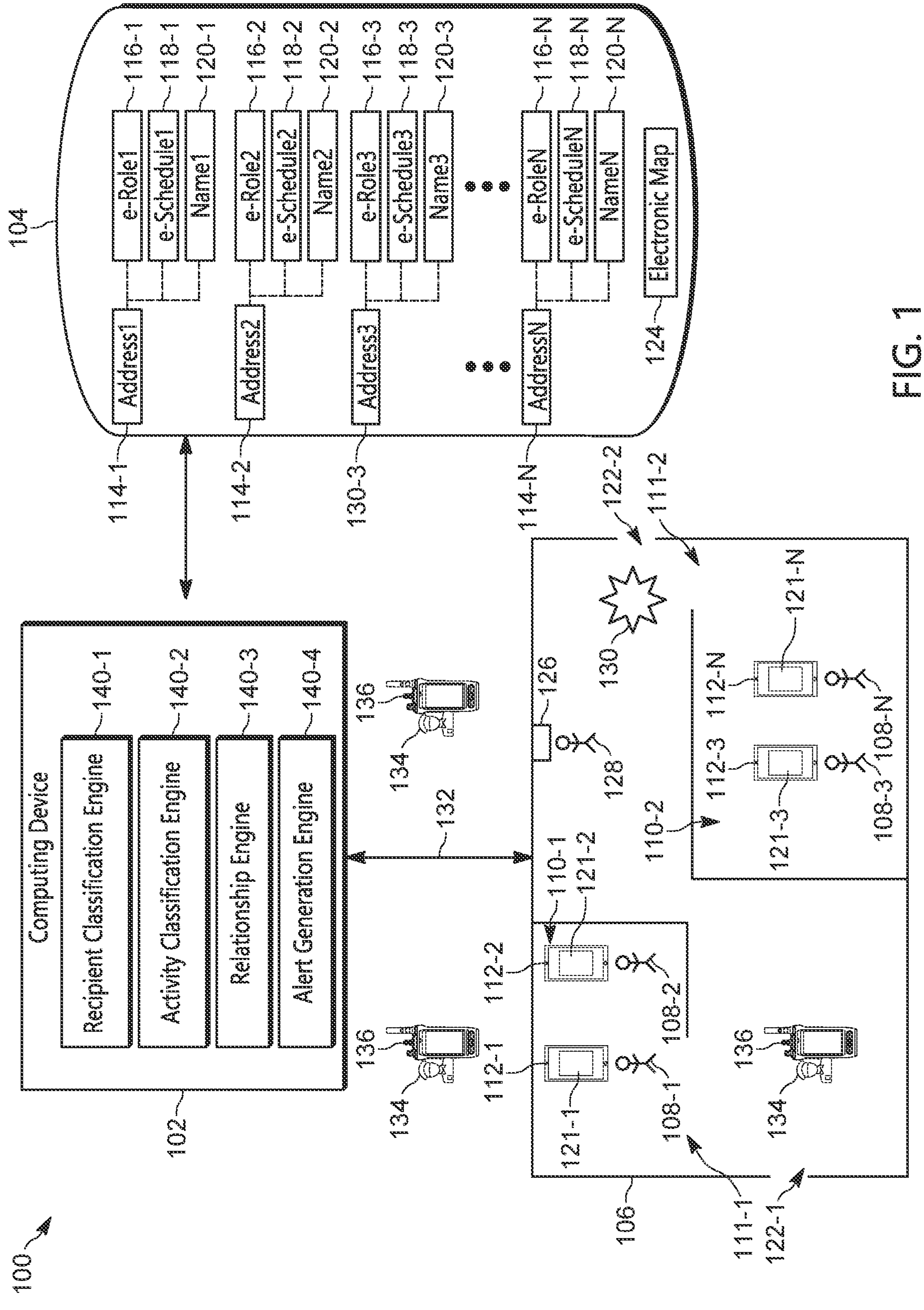
FIG. 1 is a system for reducing network bandwidth usage when providing alerts, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

When first responders respond to an incident at a premises, available bandwidth, for example on a wireless network, at the premises should be maximized to allow first responder communication devices to be utilized effectively. However, other communication devices at the premises will generally also be utilizing bandwidth, for example at least when receiving alerts about the incident from a messaging system, which may reduce available network bandwidth of the first responder communication devices. Thus, there exists a need for an improved technical method, device, and system for reducing network bandwidth usage when providing alerts.

An aspect of the present specification provides a method comprising: receiving, via a computing device, an indication of an incident associated with a given premises, the computing device communicatively coupled to at least one memory storing: network addresses associated with individuals associated with the given premises; electronic roles of the individuals; and electronic schedules of the individuals; classifying, via the computing device, the individuals as recipients or nonrecipients of alerts for the incident based on the electronic roles and the electronic schedules; determining, via the computing device, respective current activity classifications of the recipients and the nonrecipients based on the electronic roles and the electronic schedules; identifying, via the computing device, from the respective current activity classifications, respective relationship statuses between the recipients and the nonrecipients; generating, via the computing device, at least one alert based on the respective relationship statuses, the at least one alert including instructions for a recipient to carry out relative to respective nonrecipients; transmitting, via the computing device, over a network, the at least one alert to respective network addresses associated with the recipients; and refraining, via the computing device, from transmitting, over the network, the at least one alert to the respective network addresses associated with the nonrecipients.

Another aspect of the present specification provides a device comprising: a communication interface; a controller; and a computer-readable storage medium having stored thereon program code that, when executed by the controller, cause the controller to perform a method comprising: receiving, via the communication interface, an indication of an incident associated with a given premises, the controller communicatively coupled to at least one memory storing: network addresses associated with individuals associated with the given premises; electronic roles of the individuals; and electronic schedules of the individuals; classifying the individuals as recipients or nonrecipients of alerts for the incident based on the electronic roles and the electronic schedules; determining respective current activity classifications of the recipients and the nonrecipients based on the electronic roles and the electronic schedules; identifying, from the respective current activity classifications, respective relationship statuses between the recipients and the nonrecipients; generating at least one alert based on the respective relationship statuses, the at least one alert including instructions for a recipient to carry out relative to respective nonrecipients; transmitting, via the communication interface, over a network, the at least one alert to respective network addresses associated with the recipients; and refraining, from transmitting, over the network via the communication interface, the at least one alert to the respective network addresses associated with the nonrecipients.

Another aspect of the present specification provides a device comprising: a communication interface; a controller communicatively coupled to at least one memory storing: network addresses associated with individuals associated with a given premises; electronic roles of the individuals;

and electronic schedules of the individuals; the configured to: receive, via the communication interface, an indication of an incident associated with a given premises; classify the individuals as recipients or nonrecipients of alerts for the incident based on the electronic roles and the electronic schedules; determine respective current activity classifications of the recipients and the nonrecipients based on the electronic roles and the electronic schedules; identify, from the respective current activity classifications, respective relationship statuses between the recipients and the nonrecipients; generate at least one alert based on the respective relationship statuses, the at least one alert including instructions for a recipient to carry out relative to respective nonrecipients; transmit, via the communication interface, over a network, the at least one alert to respective network addresses associated with the recipients; and refrain, from transmitting, over the network via the communication interface, the at least one alert to the respective network addresses associated with the nonrecipients.

Each of the above-mentioned embodiments will be discussed in more detail below, starting with example system and device architectures of the system in which the embodiments may be practiced, followed by an illustration of processing blocks for achieving an improved technical method, device, and system for reducing network bandwidth usage when providing alerts.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions and/or program code and/or computer program code. These computer program instructions and/or program code may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions and/or program code may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions and/or program code may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for reducing network bandwidth usage when providing alerts. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks.

The system 100 comprises a computing device 102, which is communicatively coupled with at least one memory 104 (hereafter interchangeably referred to as the memory 104 for simplicity), which may be provided in the form of a database, and the like. While the memory 104 is depicted as external to the computing device 102, at least a portion of the memory 104 may be a component of the computing device 102.

The memory 104 generally stores items associated with a given premises 106 (hereinafter interchangeably referred to as the premises 106 for simplicity), which enable certain functionality of the computing device 102 as described herein. While not depicted, the items described herein as being associated with the premises 106 may be stored with an identifier (e.g., any suitable alphanumeric identifier) of the premises 106, and data exchanged by components of the system 100, that are associated with the premises 106, may include such an identifier such that associated items stored at the memory 104 may be identified and accessed.

The premises 106 may be any suitable premises, for example where incidents may occur, such as a school, a business, an office building, a sports stadium, and the like. While the premises 106 is described herein as a building, the premises may include indoor and outdoor locations, a plurality of buildings, and the like. Herein, an example of a school will be used, however such example is not to be considered unduly limiting.

As depicted, the premises 106 is associated with an "N" number of individuals 108-1, 108-2, 108-3 . . . 108-N, interchangeably referred to, collectively, as the individuals 108 and, generically and/or singly, as an individual 108. This convention will be used elsewhere in the present specification. The number "N" of the individuals 108 may be a number of individuals 108 whose respective network addresses, and associated items, are registered with the computing device 102 and/or the memory 104, in association with the premises 106, as described herein, and "N"

may be tens to hundreds to thousands of individuals 108. Furthermore, while the individuals 108 are all depicted at being at the premises 106, for example in various rooms 110-1, 110-2 of the premises 106 (e.g., the individuals 108-1, 108-2 are in room 110-1, and the individuals 108-3, 108-N are in room 110-2), not all of the individuals 108 may be at the premises 106 at any given time, and furthermore, a position of the individuals 108 may change over time.

The rooms 110-1, 110-2 are interchangeably referred to, collectively, as the rooms 110 and, generically and/or singly, as a room 110. Furthermore, as depicted, a room 110 has a respective exit 111-1, 111-2 (e.g., exits 111 and/or an exit 111), which may comprise doors, and the like, which may also be used as entrances to the rooms 110.

While only two individuals 108 are depicted in a respective room 110, there may be more than two individuals 108 in a respective room 110.

As depicted, the individuals 108 may be operating respective communication devices 112-1, 112-2, 112-3 . . . 112-N (e.g., the communication devices 112 and/or a communication devices 112), and the individuals 108 may have registered respective network addresses 114-1, 114-2, 114-3 . . . 114-N (e.g., the network addresses 114, and/or a network address 114), in association with respective electronic roles 116-1, 116-2, 116-3 . . . 116-N (e.g., the electronic roles 116, and/or an electronic role 116) of the individuals 108, respective electronic schedules 118-1, 118-2, 118-3 . . . 118-N (e.g., the respective electronic schedules 118, and/or an respective electronic schedule 118) of the individuals 108, and, optionally, respective names 120-1, 120-2, 120-3 . . . 120-N (e.g., the names 120, and/or a name 120) of the individuals 108. Associations at the memory 104 are depicted via broken lines.

Furthermore, for clarity, the network addresses 114, electronic roles 116, electronic schedules 118 and names 120 are respectively labelled with "Address#", "e-Role#", "e-Schedule#" and "Name#".

It is understood that registration of the items associated with an individual 108 may occur via a respective communication device 112, for example via respective applications 121-1, 121-2, 121-3 . . . 121-4 (e.g., applications 121 and/or an application 121) installed on the communication devices 112, for communication, registration, and the like, with the computing device 102. As depicted, the applications 121 are represented at the communication devices 112 via respective graphic user interfaces (GUIs) provided at respective display screens of the communication devices 112.

In general, the network addresses 114 may comprise network addresses associated with respective communication devices 112, and may include, but are not limited to, telephone numbers, email addresses, identifiers of the applications 121, and the like, and/or any other suitable network address that may be used to transmit alerts to the communication devices 112.

In general, the electronic roles 116 may define electronic access rights of the individuals 108 to one or more of the computing device 102 and the at least one memory 104. For example, an electronic role 116 may indicate whether an individual 108, associated with a respective network address 114, has access to initiate mass alerts, and the like, or does not have access to initiate mass alerts, and the like, for example via a respective application 121.

However, the electronic roles 116 may further define roles of the individuals 108 relative to the premises 106. For example. The electronic roles 116 may define a position of an individual 108 in an organizational chart of an organization associated with the premises 106. Using an example of the premises 106 comprising a school, the electronic roles 116 may define whether a respective individual 108 is a teacher, a student, an administrator, or any other individual have a role at the school.

Alternatively, or in addition, an electronic role 116 may indicate whether an individual 108 associated with a respective network address 114 has access rights to report incidents, and the like, or does not have access rights to report incidents, and the like, and/or generally use their respective communication device 112 to communicate during incidents. For example, to prevent false incidents from being reported, a student may not have access rights to report incidents, and/or generally use their respective communication device 112 to communicate during incidents, whereas a teacher or an administrator may have access rights to report incidents and/or generally use their respective communication device 112 to communicate during incidents.

The electronic schedules 118 may comprise schedules of the individuals 108 in an electronic format, including, but not limited to rooms 110 and associated times where respective individuals 108 may be located throughout various days, weeks, etc., vacation schedules of the respective individuals 108, and the like. Furthermore, the electronic schedules 118 may indicate, and/or be indicative of, types of activities that an individual 108 may be performing at different times. Again, using the example of the premises 106 comprising a school, the electronic schedules 116 may indicate a class schedule of a teacher or student, which may indicate a type of activity that the teacher or the student is performing, such as a physical education class (e.g., an activity of sports), an acting class (e.g., an activity of putting on costumes, etc.), and the like.

An electronic role 116, and/or an electronic schedule 118, may further indicate whether a respective individual 108 has mobility issues (e.g., in a wheelchair) or not.

In some examples, the electronic roles 116 and/or the electronic schedules 118 may specifically be stored at the memory 104, and in other examples, the electronic roles 116 and/or the electronic schedules 118 may be stored at another memory (not depicted), but accessible to the computing device 102 via any suitable identifiers stored at the memory 104 (e.g., such as the network addresses 114 and/or the names 120).

A name 120 may comprise an alphanumeric identifier of an associated individual 108, such a given name and/or a family name of an associated individual 108.

Returning to the premises 106, in addition to the rooms 110, the premises 106 may comprise various exits 122-1, 122-2 (e.g., exits 122 and/or an exit 122) which may comprise doors, and the like, which may also be used as entrances to the premises 106. The general layout of the premises 106 may be stored at the memory 104 as an electronic map 124, which may indicate respective positions, sizes etc., of the rooms 110 and the exits 111, 122, as well as any other suitable features of the premises 106. While only details of an interior of the premises 106 are depicted, the premises 106 may include exterior features (e.g., such as, in the example of a school, a campus, playing fields on the campus, other buildings on the campus, and the like), which may also be indicated by the electronic map 124.

As depicted, the premises 106 optionally further includes a physical button 126 (hereafter interchangeably referred to as the button 126), mounted in the premises 106, that, when actuated, may cause an indication of an incident to be transmitted to the computing device 102, as is next described. As such, it is understood that the button 126 may include any suitable components for transmitting such an indication (e.g., suitable communication interfaces, controllers, and the like).

In particular, the button 126 may be one of a plurality of such buttons 126 (not depicted) mounted at different positions at the premises 106, and a respective indication of an incident transmitted to the computing device 102, when a respective button 126 is actuated, may further include an indicator of a position of the respective button 126 at the premises 106, which may further indicate a position of an incident.

As depicted, an individual 128 may be in the premises 106 and view an incident 130. The individual 128 may, or may not, be an individual 108; put another way, the individual 128 may or may not be registered with the computing device 102 and/or at the memory 104 and, while not depicted, the individual 128 may or may not be operating a communication device 112. Regardless, the individual 128 may view the incident 130 that is in the vicinity of the button 126, for example adjacent the exit 122-2, and actuate the button 126 to cause the aforementioned indication of the incident 130 to be transmitted to the computing device 102. Such an indication may further include an indication of a type of the incident 130 (e.g., a one press of the button 126 may indicate a first incident type, two presses of the button 126 may indicate a second incident type, and/or lengths and/or other patterns of the pressing the button 126 may indicate an incident type).

While the incident 130 is generically depicted as a star, the incident 130 may comprise any suitable incident for which a mass alert may be generated and transmitted to at least a portion of the communication devices 112. The incident 130 may comprise, for example, an intruder and/or a crime suspect at the premises 106, a fire, a gas leak, and the like. Put another way, the incident 130 may comprise any suitable incident for which a mass alert may be generated and transmitted to at least a portion of the communication devices 112 for example upon actuation of the button 126, or based on any other suitable reporting of the incident 130, to notify individuals 108 operating respective communication devices 112 that receive the mass alert of the incident 130.

Alternatively, or in addition, the incident 130 may be reported via any suitable communication device 112, for example via a respective application 121, though whether, or not, a communication device 112 is allowed to report such an incident may depend on an associated electronic role 116, as previously described. Such reporting may further include providing a type of the incident 130 and/or a position of the incident 130 to the computing device 102.

Hence, it is understood that the communication devices 112, and the button 126, when present, are communicatively coupled to the computing device 102 and hence it is understood that the system 100 comprises communication links between the communication devices 112, and the button 126 (when present) and the computing device 102. However, for simplicity, only one communication link 132 between the computing device 102 and the premises 106 is depicted, the communication link 132 is understood to represent any suitable number of communication links between the computing device 102 and the communication devices 112, and the computing device 102 and the button 126. Hence, the communication link 132 represents a network, and network bandwidth usage thereof, due to at least the communication devices 112 in a vicinity of the premises 106.

Also depicted in FIG. 1 are various first responders 134 operating respective radios 136 (e.g., and/or any other suitable type of communication device). The first responders 134 (e.g., as depicted, police officers) may have been dispatched to the premises 106 to respond to the incident 130, and the first responders 134 will generally need to have access to as much network bandwidth (e.g., wireless network bandwidth) as possible to communicate while responding to the incident 130.

To address this issue, and to further provide instructions for a recipient of such a mass alert to carry out relative to respective nonrecipients of the mass alert, the computing device 102 may comprise, and/or operate, various engines for implementing certain functionality.

For example, as depicted, the computing device 102 comprises various engines 140-1, 140-2, 140-3, 140-4 (e.g., the engines 140 and/or an engine 140) for implementing certain functionality: recipient classification engine 140-1, an activity classification engine 140-2, a relationship engine 140-3, and an alert generation engine 140-4. However, one or more of such engines 140 may be optional and/or functionality of one or more of such engines 140 may be combined in any suitable manner, for example into one or more engines 140 (e.g., and the various engines 140-1, 140-2, 140-3, 140-4 may comprise neural network layers of one engine 140). Furthermore, one or more of the such engines 140 may be implemented using machine learning algorithms and the like, or one or more of such engines 140 may be implemented using programmatic algorithms.

In general, the computing device 102 is configured to receive an indication of an incident, such as the incident 130, associated with a given premises, such as the premises 106. Hereafter, the incident 130 and the premises 106 will be used as examples.

The recipient classification engine 140-1 classifies the individuals 108 as recipients or nonrecipients of alerts for the incident 130 based on the electronic roles 116 and the electronic schedules 118. Alternatively, or in addition, the recipient classification engine 140-1 may classify network addresses 114 associated with the individuals 108 as recipient network addresses 114 or nonrecipient network addresses 114 of alerts for the incident 130 based on the electronic roles 116 and the electronic schedules 118.

The activity classification engine 140-2 determines respective current activity classifications the recipients and the nonrecipients based on the electronic roles 116 and the electronic schedules 118. Alternatively, or in addition, the activity classification engine 140-2 may determine respective current activity classifications associated with the recipient network addresses 114 and the nonrecipient network addresses 114 based on the electronic roles 116 and the electronic schedules 118.

The relationship engine 140-3 identifies, from the respective current activity classifications, respective relationship statuses between the recipients and the nonrecipients. Alternatively, or in addition, relationship engine 140-3 may identify, from the respective current activity classifications, respective relationship statuses between the recipient network addresses 114 and the nonrecipient network addresses 114.

The alert generation engine 140-4 generates at least one alert based on the respective relationship statuses, the at least one alert including instructions for a recipient to carry out relative to respective nonrecipients.

Alternatively, or in addition, alert generation engine 140-4 may generate at least one alert based on the respective relationship statuses, the at least one alert including instructions for an individual 108 associated with a recipient network address 114 to carry out relative to individuals 108 associated with nonrecipient network addresses 114.

The computing device 102 generally transmits, over a network, as represented by the communication link 132, the at least one alert to respective network addresses 114 associated with the recipients. Put another way, the computing device 102 generally transmits, over a network, as represented by the communication link 132, the at least one alert to respective recipient network addresses 114 associated with the recipients.

However, to save bandwidth at the network, as represented by the communication link 132, the computing device 102 refrains, from transmitting, over the network, the at least one alert to the respective network addresses 114 associated with the nonrecipients. Put another way, to save bandwidth at the network, as represented by the communication link 132, the computing device 102 refrains, from transmitting, over the network, the at least one alert to the respective nonrecipient network addresses 114 associated with the nonrecipients.

As such, rather than transmit the alert to all the communication devices 112, the computing device 102 transmits the alert to only a subset of the communication devices 112 (e.g., associated with recipient network addresses 114) that is less than a total number of the communication devices 112. Put another way, rather than transmit the alert to an "N" number of the communication devices 112, the computing device 102 transmits the alert to number of the communication devices 112 that is less than "N". The saved network bandwidth may be used by the radios 136, to improve communications by the radios 136 in the system 100.

Figure 2:
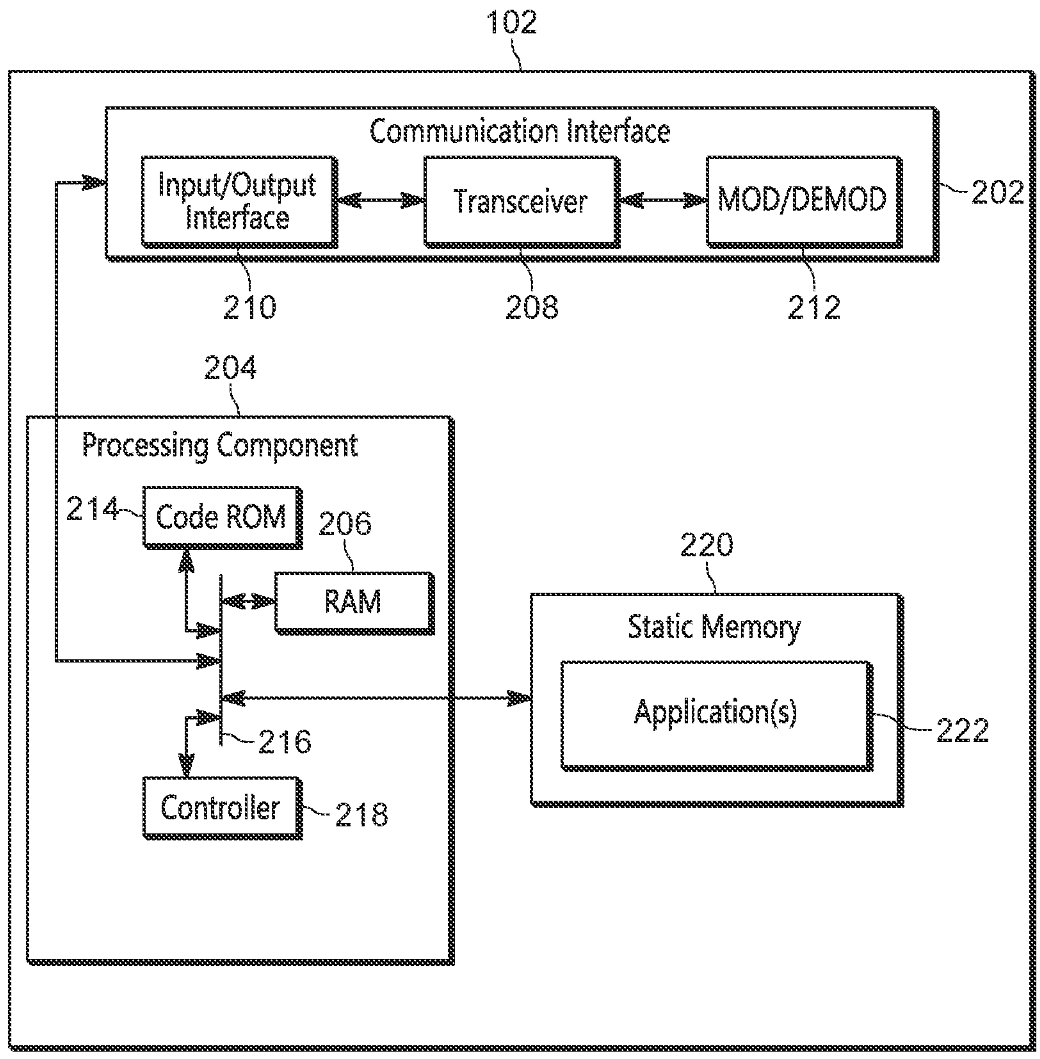
FIG. 2 is a device diagram showing a device structure of a device for reducing network bandwidth usage when providing alerts, in accordance with some examples.

Attention is next directed to FIG. 2, which depicts a schematic block diagram of an example of the computing device 102. As depicted, the computing device 102 comprises: a communication interface 202, a processing component 204, a Random-Access Memory (RAM) 206, one or more wireless transceivers 208 (which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration.

While not depicted, the computing device 102 may include one or more of an input device and a display screen and the like.

As shown in FIG. 2, the computing device 102 includes the communication interface 202 communicatively coupled to the common data and address bus 216 of the processing component 204.

The processing component 204 may include the code Read Only Memory (ROM) 214 coupled to the common data and address bus 216 for storing data for initializing system components. The processing component 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100, such as the communication devices 112, and the button 126. In some examples, the communication interface 202 may be used to communicate with the radios 136.

For example, the communication interface 202 may include one or more transceivers 208 and/or wireless transceivers for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network.

Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

However, at least a digital mobile radio (DMR) network, a Project 25 (P25) network, a terrestrial trunked radio (TETRA) network and any corresponding DMR transceiver, P25 transceiver, and TETRA transceiver may be dedicated for use by first responder radios 136 and/or any other first responder communication devices.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality for reducing network bandwidth usage when providing alerts. For example, in some examples, the computing device 102 and/or the controller 218 specifically comprises a computer executable engine configured to implement functionality for reducing network bandwidth usage when providing alerts (e.g., which may combine one or more of the engines 140).

The static memory 220 comprises a non-transitory machine readable medium that stores machine readable instructions to implement one or more programs or applications and/or program code. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

Figure 3:
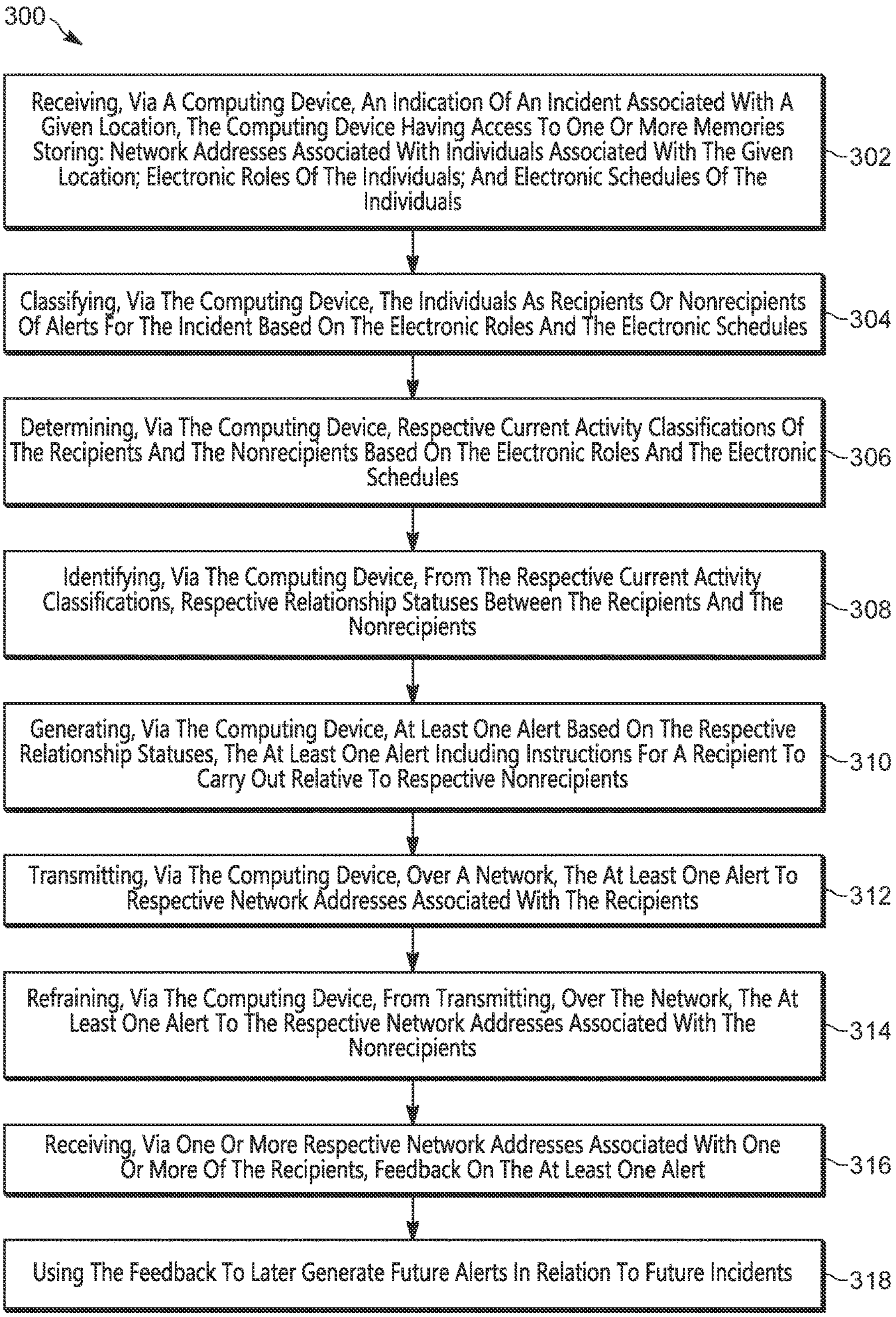
FIG. 3 is a flowchart of a method for reducing network bandwidth usage when providing alerts, in accordance with some examples.

In particular, the memory 220 stores instructions and/or program code corresponding to the at least one application 222 that, when executed by the controller 218, enables the controller 218 to implement functionality for reducing network bandwidth usage when providing alerts, including but not limited to, the blocks of the methods set forth in FIG. 3.

The memory 220 may alternatively comprise at least a portion of the memory 104, and hence the memory 220 may store at least a portion of the items stored at the memory 104.

Furthermore, the at least one application 222 may comprise instructions for implementing the engines 140.

The application 222 may include programmatic algorithms, and the like, to implement functionality as described herein.

Alternatively, and/or in addition to programmatic algorithms, the application 222 may include one or more machine learning algorithms to implement functionality as described herein.

The one or more machine learning algorithms of the application 222 may include, but are not limited to: a deep-learning based algorithm; a neural network; a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

While details of other components of the system 100 are not depicted, such as the communication devices 112 and the button 126, the communication devices 112 and the button 126 may have a structure similar to that of the computing device 102, but adapted for respective functionality of the communication devices 112 and the button 126. For example, the communication devices 112 may comprise a display screen and one or more input devices, in addition to the components depicted in FIG. 2.

Attention is now directed to FIG. 3, which depicts a flowchart representative of a method 300 for reducing network bandwidth usage when providing alerts. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222. The method 300 of FIG. 3 is one way in which the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

It is further understood in the following description that the computing device 102 is communicatively coupled to the at least one memory 104 storing: the network addresses 114 associated with individuals 108 associated with the given premises 106; electronic roles 116 of the individuals 108; and electronic schedules 118 of the individuals 108.

Furthermore, certain blocks of the method 300 may be implemented via suitable respective engines 140.

At a block 302, the controller 218, and/or the computing device 102, receives (e.g., via the communication interface 202) an indication of an incident 130 associated with a given premises 106.

Such an indication may be provided via actuation of the button 126, or via an application 121 implemented by a communication device 112.

At a block 304, the controller 218, and/or the computing device 102, classifies the individuals 108 as recipients or nonrecipients of alerts for the incident 130 based on the electronic roles 116 and the electronic schedules 118.

Alternatively, or in addition, at the block 304, the controller 218, and/or the computing device 102, classifies the network addresses 114 associated with the individuals 108 as recipient network addresses 114 or nonrecipient network addresses 114 of alerts for the incident 130 based on the electronic roles 116 and the electronic schedules 118.

The block 304 may be implemented via the recipient classification engine 140-1.

At a block 306, the controller 218, and/or the computing device 102, determines respective current activity classifications of the recipients and the nonrecipients based on the electronic roles 116 and the electronic schedules 118;

Alternatively, or in addition, at the block 306, the controller 218, and/or the computing device 102, determines respective current activity classifications associated with the recipient network addresses 114 and the nonrecipient network addresses 114 based on the electronic roles 116 and the electronic schedules 118.

The block 306 may be implemented via the activity classification engine 140-2.

At a block 308, the controller 218, and/or the computing device 102, identifies, from the respective current activity classifications, respective relationship statuses between the recipients and the nonrecipients.

Alternatively, or in addition, at the block 308, the controller 218, and/or the computing device 102, identifies, from the respective current activity classifications, respective relationship statuses between the recipient network addresses 114 and the nonrecipient network addresses 114.

The block 308 may be implemented via the relationship engine 140-3.

At a block 310, the controller 218, and/or the computing device 102, generates at least one alert based on the respective relationship statuses, the at least one alert including instructions for a recipient to carry out relative to respective nonrecipients.

Alternatively, or in addition, at the block 310, the controller 218, and/or the computing device 102, generates at least one alert based on the respective relationship statuses, the at least one alert including instructions for an individual 108 associated with a recipient network address 114 to carry out relative to individuals 108 associated with nonrecipient network addresses 114.

The block 310 may be implemented via the alert generation engine 140-4.

At a block 312, the controller 218, and/or the computing device 102, transmits (e.g., via the communication interface 202), over a network (e.g., the communication link 132), the at least one alert to respective network addresses 114 associated with the recipients.

Put another way, at the block 312, the controller 218, and/or the computing device 102, generally transmits, over a network, as represented by the communication link 132, the at least one alert to respective recipient network addresses 114 associated with the recipients.

At a block 314, the controller 218, and/or the computing device 102, refrains from transmitting, over the network (e.g., the communication link 132 and/or via the communication interface 202)), the at least one alert to the respective network addresses 114 associated with the nonrecipients.

Put another way, at the block 314, the controller 218, and/or the computing device 102, to save bandwidth at the network, as represented by the communication link 132, the computing device 102 refrains, from transmitting, over the network, the at least one alert to the respective nonrecipient network addresses 114 associated with the nonrecipients.

In some examples, the method 300 may end at the block 314.

In other examples, for example where the application 222 and/or the engines 140 include one or more machine learning algorithms, at a block 316, the controller 218, and/or the computing device 102, receives, via one or more respective network addresses 114 associated with one or more of the recipients, feedback on the at least one alert.

The feedback may be received from one or more of the communication devices 112, and may comprise a score, for example on a scale of 0 to 1, 0 to 100, or another suitable scale, that scores the output of the one or more machine learning algorithms, such as the instructions of at least one alert transmitted at the block 312. A score of 0 may indicate the that instructions were scored as low as possible, indicating, for example, that a recipient of the instructions could not carry out the instructions, or that the instructions put recipients and/or nonrecipients in harm's way, and the like, relative to the incident 130. Conversely, a score of 1 (e.g., on a scale of 0 to 1), or 100 (e.g., on a scale of 0 to 100) may indicate the that instructions were scored as high as possible, indicating, for example, that a recipient of the instructions successfully carried out the instructions, or that the instructions were successful in bringing the recipients and/or nonrecipients to safety, and the like, relative to the incident 130.

In some examples, the feedback may be stored, for example at the memory 104 and/or the memory 220, for example for use when the engines 140 are placed into a training mode (described below with respect to FIG. 7).

At a block 318, the controller 218, and/or the computing device 102, uses the feedback to later generate future alerts in relation to future incidents.

For example, the one or more machine learning algorithms may be placed in a training mode, and the scored output, as well the input that lead to the scored output, are used to train the one or more machine learning algorithms to better generate alerts and associated instructions, and the like.

The method 300 may include other features.

For example, the indication of the incident 130, of block 302, may define a type of the incident 130, and the at least one alert, of the block 310, may be generated based on the type of the incident 130.

For example, the instructions of the at least one alert may be customized according to the incident type, and/or the instructions of the at least one alert may include the incident type.

In some examples, the at least one alert may include instructions for different recipients to carry out relative to the respective nonrecipients, the instructions being based on: incident type; the electronic roles 116; the electronic schedules 118; and at least one of the respective activity classifications, of the block 306, and the respective relationship statuses, of the block 308.

For example, the individuals 108-1, 108-3 may be classified as recipients (e.g., the individuals 108-1, 108-3 may be teachers), the individuals 108-2, 108-N may be classified as nonrecipients (e.g., the individuals 108-2, 108-N may be students, and there may be one teacher in a room 110 with a plurality of students, such that the individuals 108-2, 108-N may respectively represent a plurality of students with respective communication devices 112), and the incident 130 may comprise an intruder incident type. Furthermore, the electronic roles 116 and the electronic schedules 118 and at least one of the respective activity classifications may indicate that the individual 108-1 is teaching a physed class in room 110-1, to the individual 108-2, and the individual 108-1 is teaching a drama class in room 110-2, to the individual 108-N. As such, the individuals 108-1, 108-2 may be determined to have a higher probability of being able to evacuate the premises 106 (e.g., via the exits 111-1, 122-1) rapidly and/or may have a higher probability of good mobility, and the individuals 108-3, 108-N may be determined to have a lower probability of being able to evacuate the premises 106 (e.g., via the exits 111-2, 122-2) rapidly and/or may have a lower probability of good mobility.

Hence, instructions in an alert to the network address 114-1 associated with the individual 108-1 (e.g., sent to the communication device 112-1) may comprise: "Intruder adjacent exit 122-2; please assist the students to exit the premises", and instructions in an alert to the network address 114-2 associated with the individual 108-2 (e.g., sent to the communication device 112-2) may comprise: "Intruder adjacent exit 122-2; please shelter in place with the students".

In some examples, as previously described, the electronic roles 116 may define electronic access rights of the recipients and the nonrecipients to one or more of the computing device 102 and the at least one memory 104. In more specific examples, the electronic roles 116 may further define roles of the recipients and the nonrecipients relative to the given premises 106.

In some examples, the instructions, of the block 310, for the recipient to carry out relative to the respective nonrecipients may comprise one of: first instructions for guiding the nonrecipients to a position relative to one or more of the given premises 106 and the incident 130; and second instructions for the recipients to implement an activity relative to one or more of the given premises 106 and the incident 130.

For example, the probability of the individuals 108-3, 108-N being able to evacuate the premises 106 (e.g., via the exits 111-1, 122-1) rapidly may also be lowered via the locations of the exits 111-2, 122-2 relative to a location of the incident 130 being adjacent the exit 122-2 (e.g., as at least partially based on the electronic map 124).

For, instructions in an alert to the network address 114-1 associated with the individual 108-1 (e.g., sent to the communication device 112-1) may comprise: "Intruder adjacent exit 122-2; please assist the students to exit the premises via the door 122-1", and instructions in an alert to the network address 114-2 associated with the individual 108-2 (e.g., sent to the communication device 112-2) may comprise: "Intruder adjacent exit 122-2; please shelter in place with the students in room 110-2".

As such, it is further understood that, in some examples, the at least one alert may include instructions for different recipients to carry out relative to the respective nonrecipients, the instructions being based on: incident type; the electronic roles 116; the electronic schedules 118; the electronic roles 116; the electronic schedules 118; and at least one of the respective activity classifications, of the block 306, the respective relationship statuses, of the block 308, and the location of the incident 130.

In some examples, the at least one alert, as transmitted at the block 312, may comprise one or more of an email, a text message and a multimedia messaging service message. However, the at least one alert may be transmitted, at the block 312, via respective applications 121.

In some examples, the method 300 may include a registration process, which may occur prior to implementing the block 302. In particular, the method 300 may further comprise, the controller 218, and/or the computing device 102: receiving registration data to register respective network addresses 114, respective electronic roles 116 and respective electronic schedules 118 of the individuals 108 at the at least one memory 104. Such registration may occur via an application 121. Such registration may occur using a communication device 112 operated by the individual 108 being registered, or another individual 108 operating another communication device 112, who has administrative rights to perform such registration (e.g., which may be indicated by a respective electronic role 116). Furthermore, a respective electronic role 116 may be assigned at the time of registration using, for example, by the other individual 108 operating the communication device 112, who has administrative rights to assign electronic roles 116 (e.g., which may be indicated by a respective electronic role 116). Alternatively, or in addition, an electronic role 116 may be assigned based on employee number, or a student number, and the like, provided in the registration process, and which may be stored in another memory in association with an indication of an electronic role 116 to be assigned (e.g., to teachers, administrators or students, and the like).

Conversely, the method 300 may include a registration process, which may occur after to implementing the block 314. In particular, the method 300 may further comprise, the controller 218, and/or the computing device 102: receiving de-registration data to de-register one or more respective network addresses 114, one or more respective electronic roles 116 and one or more respective electronic schedules 118 of one or more of the individuals 108 at the at least one memory 104. In this manner, an individual 108 who was once associated with the premises 106 may deregister when disassociated with the premises 106 (e.g., when the premises 106 comprises a school, a teacher or an administrator may leave a job at the school, or a student may graduate from the school). Such deregistration may occur using a communication device 112 operated by the individual 108 being deregistered, or another individual 108 operating another communication device 112, who has administrative rights to perform such deregistration (e.g., which may be indicated by a respective electronic role 116).

Figure 4:
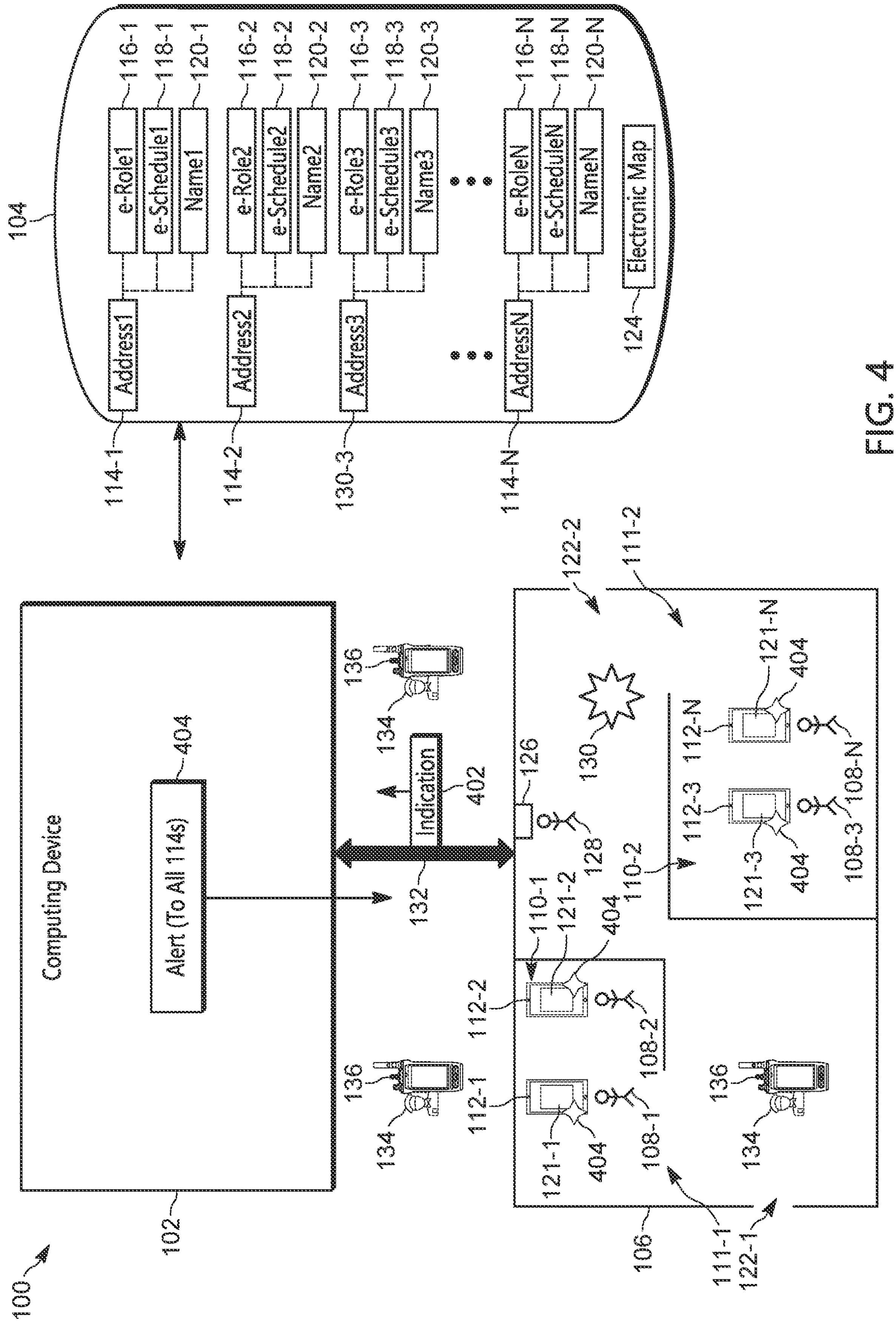
FIG. 4 depicts the system of FIG. 1 in a mode where a method for reducing network bandwidth usage when providing alerts is not implemented, in accordance with some examples.
Figure 5:
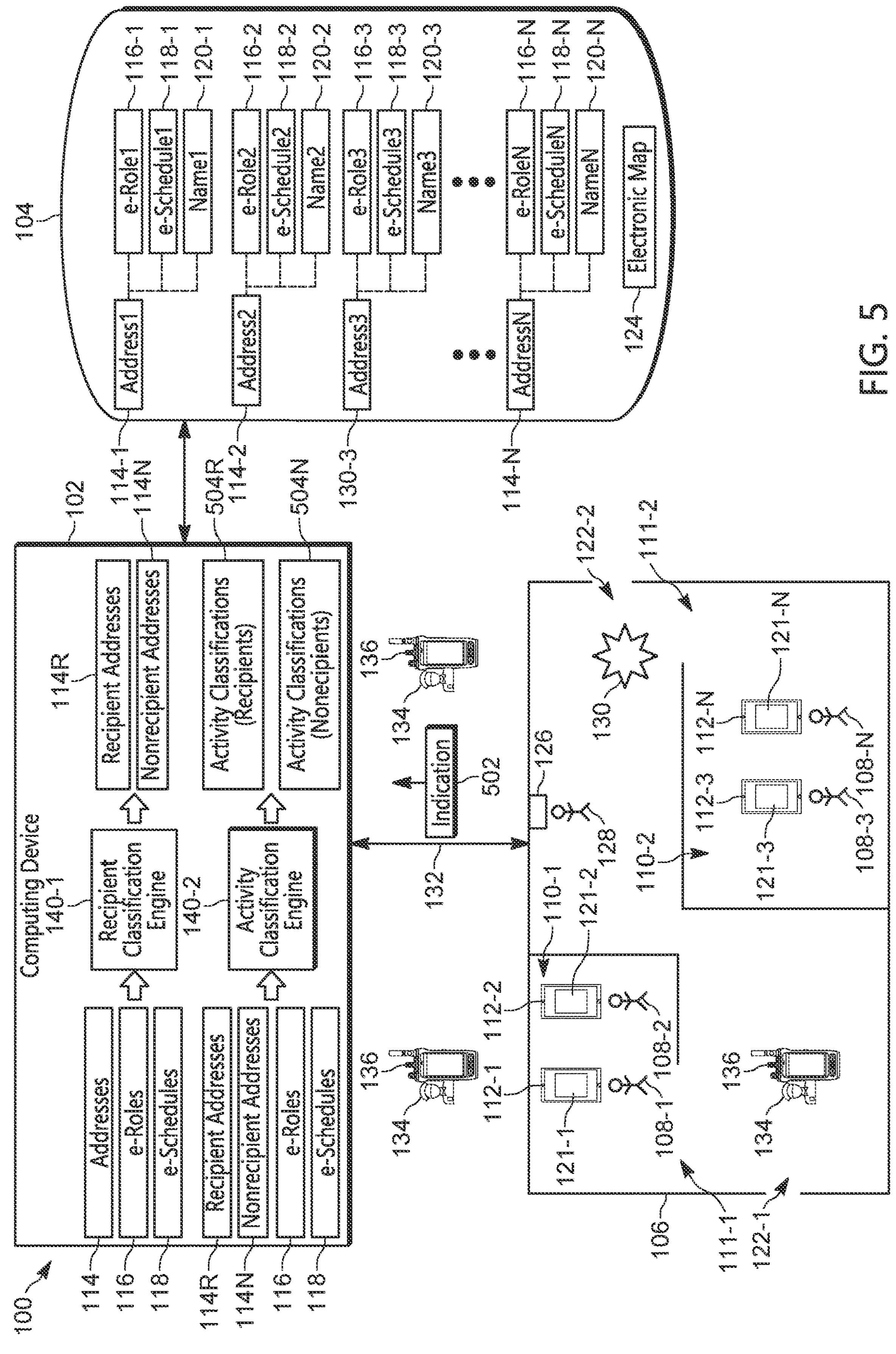
FIG. 5 depicts the system of FIG. 1 in a mode where a method for reducing network bandwidth usage when providing alerts is implemented, in accordance with some examples.
Figure 6:
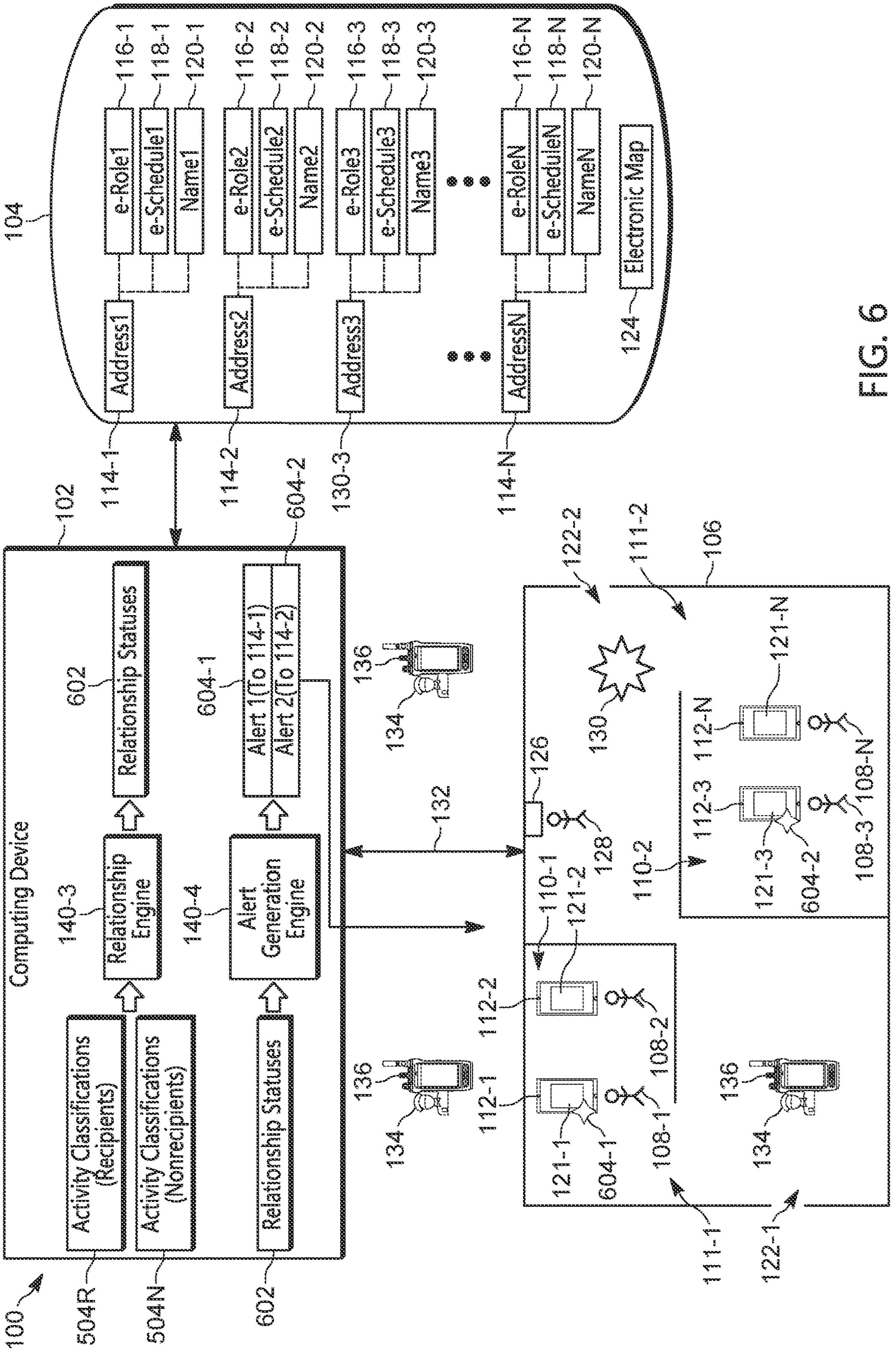
FIG. 6 depicts the system of FIG. 1 continuing to implement the method for reducing network bandwidth usage when providing alerts, in accordance with some examples.
Figure 7:
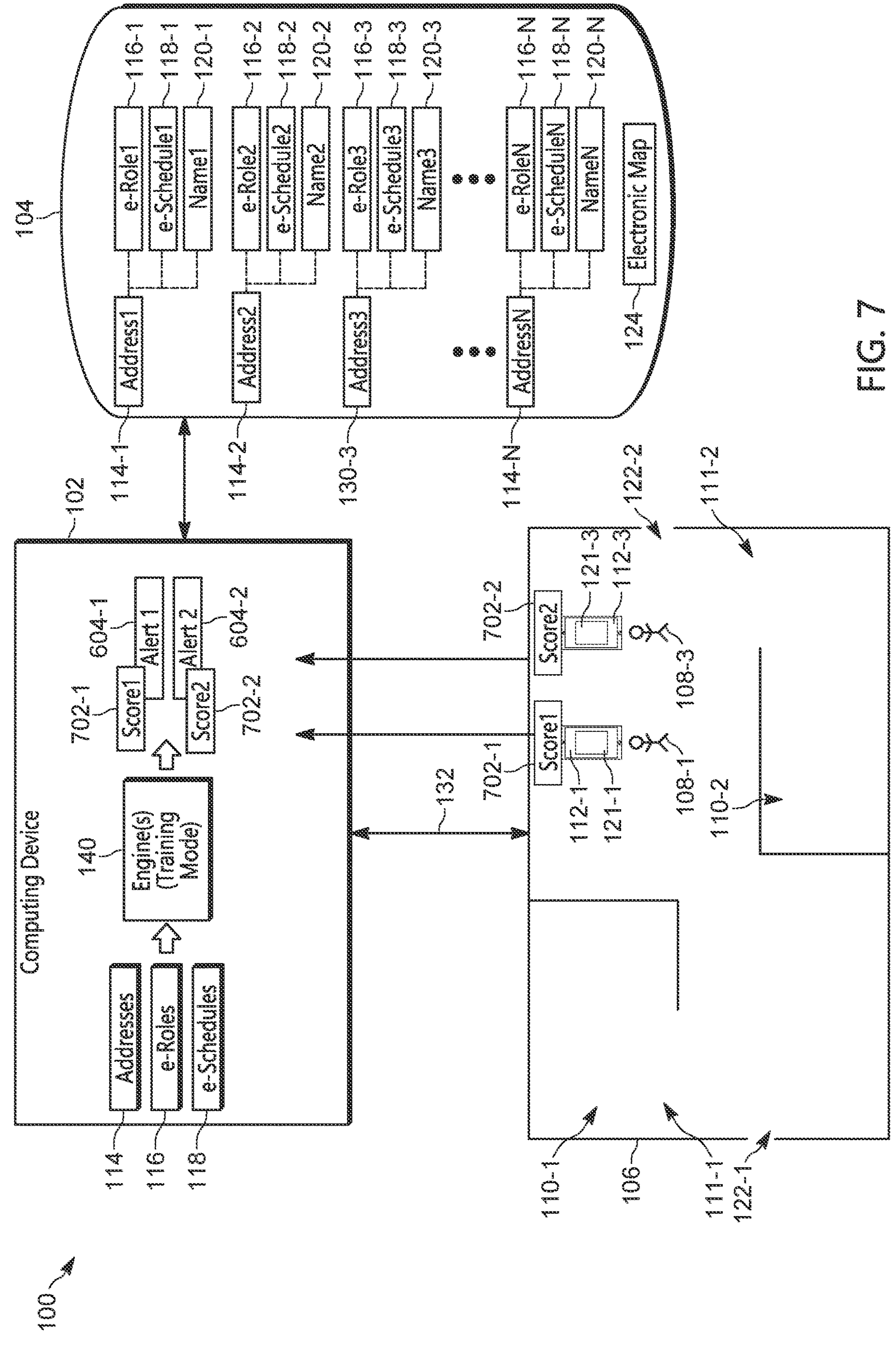
FIG. 7 depicts the system of FIG. 1 continuing to implement the method for reducing network bandwidth usage when providing alerts, in accordance with some examples.

Attention is next directed to FIG. 4, which depicts the system 100 in a mode where the method 300 is not implemented, and FIG. 5, FIG. 6, and FIG. 7, which depict an example of the method 300 being implemented in the system 100. FIG. 4, FIG. 5, FIG. 6, and FIG. 7 are similar to FIG. 1, with like components having like numbers.

Furthermore, while not all components of the system 100 are depicted in FIG. 4, FIG. 5, FIG. 6, and FIG. 7 for simplicity, such components may nonetheless be present. In particular, not all engines 140 are depicted in all of FIG. 4, FIG. 5, FIG. 6, and FIG. 7, but may nonetheless be present. Furthermore, flow of data with respect to engines 140 is depicted in FIG. 4, FIG. 5, FIG. 6, and FIG. 7 using hollow arrows.

Attention is first directed to FIG. 4, which depicts the system 100 in a mass alert mode (e.g., in which the method 300 is not being implemented).

In the depicted mode, an indication 402 of the incident 130 is transmitted to the computing device 102, and the computing device 102 responsively transmits a mass alert 404 to all of the network addresses 114 associated with the premises 106. Hence, as depicted, the mass alert 404 is provided at all of the communication devices 112. While details of the mass alert 404 are not depicted, and generically depicted at the communication devices 112 as a star, the mass alert 404 may comprise text indicating the incident 130, such as "Incident on premises; evacuate".

As such a mass alert 404 is transmitted to all the network addresses 114, usage of the network bandwidth increases, as represented by the communication link 132 being shown as wider as compared to FIG. 1. Such usage may interfere with communications of the radios 136.

Attention is next directed to FIG. 5, which depicts the system 100 implementing aspects of the method 300.

As depicted, an indication 502 of the incident 130 is transmitted to the computing device 102, and received (e.g., at the block 302 of the method 300) at the computing device 102. The computing device 102 responsively retrieves the network addresses 114, the electronic roles 116 and the electronic schedules 118 associated with the premises 106 from the memory 104, and inputs the network addresses 114, the electronic roles 116 and the electronic schedules 118 associated with the premises 106 into the recipient classification engine 140-1. The recipient classification engine 140-1 outputs recipient network addresses 114R and nonrecipient network addresses 114N.

Put another way, the recipient classification engine 140-1 classifies (e.g., at the block 304 of the method 300) the individuals 108, or more specifically their associated network addresses 114, as recipients and/or recipient network addresses 114R or nonrecipients and/or nonrecipient network addresses 114N of alerts for the incident 130.

FIG. 5 further depicts the computing device 102 inputting the recipient network addresses 114R and the nonrecipient network addresses 114N, the electronic roles 116 and the electronic schedules 118 associated with the premises 106 into the activity classification engine 140-2. The activity classification engine 140-2 outputs activity classifications 504R associated with recipients and/or recipient network addresses 114R, and activity classifications 504N associated with nonrecipients and/or nonrecipients network addresses 114N.

Put another way, the activity classification engine 140-2 determines (e.g., at the block 306 of the method 300) respective current activity classifications 504R, 504N of the recipients and the nonrecipients based on the electronic roles 116 and the electronic schedules 118.

For example, the activity classifications 504R associated with recipients and/or recipient network addresses 114R may indicate that the respective individuals 108-1, 108-3 are teachers respectively teaching a physed class and a drama class in respective rooms 110-1, 110-2 at the current time, and/or the activity classifications 504R associated with recipients and/or recipient network addresses 114R may indicate that the respective individuals 108-1, 108-3 are respectively have good mobility and poor mobility. While such terms are relative, such terms may generally indicate that the individual 108-1 is able to evacuate the premises 106 and that the individual 108-1 is unable to evacuate the premises 106.

Similarly, the activity classifications 504N associated with nonrecipients and/or nonrecipient network addresses 114R may indicate that the respective individuals 108-2, 108-N are students respectively being taught a physed class and a drama class in respective rooms 110-1, 110-2 at the current time, and/or the activity classifications 504N associated with nonrecipients and/or nonrecipient network addresses 114R may indicate that the respective individuals 108-2, 108-N are respectively have good mobility and poor mobility. While such terms are relative, such terms may generally indicate that the individual 108-2 is able to evacuate the premises 106 and that the individual 108-N is unable to evacuate the premises 106.

Whether or not an individual 108 has good mobility or poor mobility, may also be indicated in an electronic role 116, and/or an electronic schedule 118, which may further indicate whether a respective individual 108 has mobility issues (e.g., in a wheelchair) or not, and such an indication may affect the respective activity classifications 504R, 504N.

Attention is next directed to FIG. 6, which is understood to follow from FIG. 5. In FIG. 6, the respective activity classifications 504R, 504N are input to the relationship engine 140-3, which output respective relationship statuses 602 between the recipients and the nonrecipients and/or between the individuals 108 associated with recipient network addresses 114R and nonrecipient network addresses 114N.

Put another way, the relationship engine 140-3 identifies (e.g., at the block 308 of the method 300) from the respective current activity classifications 504R, 504N, respective relationship statuses 602 between the recipients and the nonrecipients and/or between the individuals 108 associated with recipient network addresses 114R and nonrecipient network addresses 114N.

For example, the respective relationship statuses 602 may indicate that the (recipient) individual 108-1 is located with the (nonrecipient) individual 108-2, and/or that the (recipient) individual 108-1 is teaching the (nonrecipient) individual 108-2, and the like, in the room 110-1, at the current time.

Similarly, the respective relationship statuses 602 may indicate that the (recipient) individual 108-3 is located with the (nonrecipient) individual 108-N, and/or that the (recipient) individual 108-3 is teaching the (nonrecipient) individual 108-N, and the like, in the room 110-N, at the current time.

FIG. 6 further depicts the computing device 102 inputting the respective relationship statuses 602 into the alert generation engine 140-4, which outputs alerts 604-1, 604-2 (e.g., the alerts 604 and/or an alert 604), the alerts 604 including instructions for a respective recipient to carry out relative to respective nonrecipients.

Put another way, alert generation engine 140-4 generates (e.g., at the block 310 of the method 300) the at least one alert 604 including instructions for a recipient to carry out relative to respective nonrecipients, and/or the at least one alert including instructions for an individual 108 associated with a recipient network address 114 to carry out relative to individuals 108 associated with nonrecipient network addresses 114.

For example, a first alert 604-1 may be associated with the recipient network address 114-1 and may include text "Intruder adjacent exit 122-2; please assist the students to exit the premises via the door 122-1". The second alert 604-1 may be associated with the recipient network address 114-2 and may include text "Intruder adjacent exit 122-2; please shelter in place with the students in room 110-2".

Furthermore, in some examples, the first alert 604-1 may include a list of (nonrecipient) individuals 108 (e.g., indicated via respective names 120), such as the individual 108-2, associated with the (recipient) individual 108-1. Similarly, the second alert 604-2 may include a list of (nonrecipient) individuals 108 (e.g., indicated via respective names 120), such as the individual 108-N, associated with the (recipient) individual 108-3. Such a list may further indicate any nonrecipient individuals 108 with mobility issues (e.g. such as being a wheelchair) and who may need additional assistance.

Furthermore, when any nonrecipient individuals 108 have mobility issues, a respective alert 604 may indicate that the recipient individual 108 is to provide other nonrecipient individuals 108 with instructions to exit the premises 106, and to otherwise shelter in place with any nonrecipient individuals 108 have mobility issues.

As depicted, the first alert 604-1 is transmitted (e.g., at the block 312 of the method 300) to the recipient network address 114-1 associated with the (recipient) individual 108-1, and provided at the communication device 112-1. Similarly, the second alert 604-2 is transmitted (e.g., at the block 312 of the method 300) to the recipient network address 114-3 associated with the (recipient) individual 108-3, and provided at the communication device 112-3.

Furthermore, the computing device 102 refrains (e.g., at the block 314 of the method 300) from transmitting the alerts 604 to the nonrecipient network addresses 114.

As such, use of network bandwidth on the communication link 132 is reduced relative use of network bandwidth on the communication link 132 as described with respect to FIG. 4, as indicated by the communication link 132 depicted in FIG. 6 having a narrower width than the communication link 132 as depicted in FIG. 4.

Attention is next directed to FIG. 7, which depicts the system 100 after the incident 130 has been resolved. For example, any individual 108 who are students have left the premises 106, and so have the first responders 134. In particular, the individuals 108-1, 108-3 are operating their respective communication devices 112-1, 112-3 to provide respective feedback 702-1, 702-2 for the respective alerts 604-1, 604-2. For example, the feedback 702-1, 702-2 may comprise respective scores (e.g., Score1 and Score2), on any of the aforementioned scales, that rate the respective alerts 604-1, 604-2.

The computing device 102 receives (e.g., at the block 316 of the method 300) the feedback 702-1, 702-2, and places the engines 140 into a training mode, which the initial input to the engines 140 (e.g., the network addresses 114, the electronic roles 116 and the electronic schedules 118 input to the recipient classification engine 140-1 are used as training input, and the respective alerts 604-1, 604-2 and the associated feedback 702-1, 702-2 are used as training output, to train (e.g., at the block 318 of the method 300) the engines 140 to later generate future alerts in relation to future incidents.

The method 300 may be applied to other scenarios. For example, when the incident 130 is a fire or a gas leak, and the like, the alerts 604 may include evacuation instructions specific to the (recipient) individuals 108 who are to assist the (nonrecipient) individuals 108, such as including evacuation paths out of the premises 106 that avoid the incident 130.

Similarly, the premises 106 may comprise a restaurant, and the memory 104 may be at least partially populated using a reservation system (not depicted) such that the items stored at the memory 104 indicate network addresses 114, electronic roles 116, electronic schedules 118 and names 120 of both employees and patrons of the restaurant. For example, network addresses 114, electronic roles 116, electronic schedules 118 and names 120 of employees of the restaurant may be stored at the memory 104 via the application 222, but network addresses 114, electronic roles 116, electronic schedules 118 and names 120 of patrons of the restaurant may be stored at the memory 104 via the reservation system. For such patrons, the electronic schedules 118 may indicate a time and date of a reservation. Once a time of the reservation for a patron passes, the items associated with the patron may be removed from the memory 104 in the aforementioned deregistration process, though such deregistration may be dynamically implemented by the reservation system.

In the restaurant example, some employees (e.g. their respective network addresses 114) may be designated as recipients (e.g. designated fire marshals as indicated by respective electronic roles 116, and the like) and the patrons (e.g. their respective network addresses 114) may be designated as nonrecipients. Furthermore, the alerts to the recipient employees may depend on whether they are front of house, interacting with the patrons, or back of house (e.g. in a kitchen) and not interacting with the patrons. For example, an alert to front of house recipient employees may provide instructions for evacuating the patrons (and front of house nonrecipient employees) and a list of the patrons (and front of house nonrecipient employees), and an alert to back of house recipient employees may provide instructions for evacuating fellow nonrecipient back of house employees and a list of back of house nonrecipient employees.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic alerts, cannot reduce bandwidth usage, cannot train a machine learning algorithm, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions and/or program code (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions and/or program code, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of reducing bandwidth usage of a network in association with a given premises, comprising:

receiving, via a computing device, a first indication of a first incident associated with the given premises, the computing device communicatively coupled to at least one memory storing:

network addresses of communication devices associated with individuals associated with the given premises, wherein the individuals have previously registered respective network addresses to receive mass alerts from the computing device over the network, and wherein network bandwidth of the network, in association with the given premises, is usable by first responder radios, located proximal to or at the given premises, to communicate in association with incidents;

electronic roles of the individuals; and electronic schedules of the individuals;

operating, via the computing device, in a mass alert mode comprising transmitting a first mass alert associated with the first incident to all communication devices associated with the network addresses;

receiving, via the computing device, feedback associated with the first mass alert from one or more of the communication devices;

using the feedback, via the computing device, to later generate, via one or more alert generation engines of the computing device, alerts for future incidents;

receiving, via the computing device, a second indication of a second incident associated with the given premises;

implementing, at the computing device, using the one or more alert generation engines, a mode for reducing bandwidth usage of the network comprising:

classifying, via the computing device, the respective network addresses as recipient network addresses or nonrecipient network addresses of alerts for the second incident based on the electronic roles and the electronic schedules, regardless of the individuals having previously registered to receive mass alerts;

determining, via the computing device, respective current activity classifications associated with the recipient network addresses and the nonrecipient network addresses based on the electronic roles and the electronic schedules;

identifying, via the computing device, from the respective current activity classifications, respective relationship statuses between the recipient network addresses and the nonrecipient network addresses;

generating, via the computing device, a second mass alert based on the respective relationship statuses, the second mass alert including device-executable instructions executable by the communication devices associated with the recipient network addresses to carry out relative to individuals associated with respective nonrecipient network addresses, the device-executable instructions being based at least in part on a location of the second incident;

transmitting, via the computing device, over the network, the second mass alert only to the communication devices associated with the recipient network addresses;

refraining, via the computing device, from transmitting, over the network, the second mass alert to the communication devices associated with the nonrecipient network addresses, thereby reducing usage of the network bandwidth of the network in association with the given premises as compared to the mass alert mode, the network bandwidth usage reduced by an amount defined by a number of the nonrecipient network addresses; and communicating, using saved network bandwidth, at the first responder radios, in association with the second incident, the saved network bandwidth being due to the reducing of the usage of the network bandwidth of the network that occurs when refraining from transmitting the second mass alert to the communication devices associated with the nonrecipient network addresses.

2. The method of claim 1, wherein an indication of an incident defines a type of the incident, and wherein the mass alerts are generated based on the type of the incident.

3. The method of claim 1, wherein the device-executable instructions are based on: incident type of the second incident; the electronic roles and the electronic schedules; at least one of the respective activity classifications; and the respective relationship statuses.

4. The method of claim 1, wherein the electronic roles define electronic access rights of the individuals to one or more of the computing device and the at least one memory.

5. The method of claim 4, wherein the electronic roles further define roles of the individuals relative to the given premises.

6. The method of claim 1, wherein the device-executable instructions comprise one of:

first device-executable instructions for guiding individuals associated with the nonrecipient network addresses to a position relative to one or more of the given premises and the second incident; and second device-executable instructions for individuals associated with the recipient network addresses to implement an activity relative to one or more of the given premises and the second incident.

7. The method of claim 1, wherein the second mass alert comprises one or more of an email, a text message and a multimedia messaging service message.

8. The method of claim 1, further comprising:

receiving registration data to register respective network addresses, respective electronic roles and respective electronic schedules of the individuals at the at least one memory.

9. The method of claim 1, further comprising:

receiving de-registration data to de-register one or more respective network addresses, one or more respective electronic roles and one or more respective electronic schedules of one or more of the individuals at the at least one memory.

10. A device comprising:

a communication interface;

a controller; and a computer-readable storage medium having stored thereon program code that, when executed by the controller, cause the controller to perform a method comprising:

receiving, via the communication interface, a first indication of a first incident associated with a given premises, the controller communicatively coupled to at least one memory storing:

network addresses of communication devices associated with individuals associated with the given premises, wherein the individuals have previously registered respective network addresses to receive mass alerts from the device over a network, and wherein network bandwidth of the network, in association with the given premises, is usable by first responder radios, located proximal to or at the given premises, to communicate in association with incidents;

electronic roles of the individuals; and electronic schedules of the individuals;

operating in a mass alert mode comprising transmitting a first mass alert associated with the first incident to all communication devices associated with the network addresses;

receiving, via the communication interface, feedback associated with the first mass alert from one or more of the communication devices;

using the feedback to later generate, via one or more alert generation engines of the device, alerts for future incidents;

receiving, via the communication interface, a second indication of a second incident associated with the given premises;

implementing, using the one or more alert generation engines, a mode for reducing bandwidth usage of the network comprising:

classifying the respective network addresses as recipient network addresses or nonrecipient network addresses of alerts for the second incident based on the electronic roles and the electronic schedules, regardless of the individuals having previously registered to receive the mass alerts;

determining respective current activity classifications associated with the recipient network addresses and the nonrecipient network addresses based on the electronic roles and the electronic schedules;

identifying, from the respective current activity classifications, respective relationship statuses between the recipient network addresses and the nonrecipient network addresses;

generating a second mass alert based on the respective relationship statuses, the second mass alert including device-executable instructions executable by the communication devices associated with the recipient network addresses to carry out relative to individuals associated with respective nonrecipient network addresses, the device-executable instructions being based at least in part on a location of the second incident;

transmitting, via the communication interface, over the network, the second mass alert only to the communication devices associated with the recipient network addresses;

refraining, from transmitting, over the network via the communication interface, the second mass alert to the communication devices associated with the nonrecipient network addresses, thereby reducing usage of the network bandwidth of the network in association with the given premises as compared to the mass alert mode, the network bandwidth usage reduced by an amount defined by a number of the nonrecipient network addresses; and communicating, using saved network bandwidth, at the first responder radios, in association with the second incident, the saved network bandwidth being due to the reducing of the usage of the network bandwidth of the network that occurs when refraining from transmitting the second mass alert to the communication devices associated with the nonrecipient network addresses.

11. The device of claim 10, wherein an indication of an incident defines a type of the incident, and wherein the mass alerts are generated based on the type of the incident.

12. The device of claim 10, wherein the device-executable instructions are based on: incident type of the second incident; the electronic roles and the electronic schedules; at least one of the respective activity classifications; and the respective relationship statuses.

13. The device of claim 10, wherein the electronic roles define electronic access rights of the individuals to one or more of the device and the at least one memory.

14. The device of claim 13, wherein the electronic roles further define roles of the individuals relative to the given premises.

15. The device of claim 10, wherein the device-executable instructions comprise one of:

first device-executable instructions for guiding individuals associated with the nonrecipient network addresses to a position relative to one or more of the given premises and the second incident; and second device-executable instructions for individuals associated with the recipient network addresses to implement an activity relative to one or more of the given premises and the second incident.

16. The device of claim 10, wherein the second mass alert comprises one or more of an email, a text message and a multimedia messaging service message.

17. The device of claim 10, wherein the method further comprises:

receiving registration data to register respective network addresses, respective electronic roles and respective electronic schedules of the individuals at the at least one memory.

18. The device of claim 10, wherein the method further comprises:

receiving de-registration data to de-register one or more respective network addresses, one or more respective electronic roles and one or more respective electronic schedules of one or more of the individuals at the at least one memory.

* * * * *